United States Patent [19]
Yokoi et al.

[11] Patent Number: 4,727,801
[45] Date of Patent: Mar. 1, 1988

[54] DEFROSTING CABINET

[75] Inventors: Genkichi Yokoi; Noriyuki Harada; Kozo Shimba; Kenyo Matsushita, all of Ihara, Japan

[73] Assignee: Nippon Light Metal Company Limited, Tokyo, Japan

[21] Appl. No.: 772,691

[22] Filed: Sep. 5, 1985

[51] Int. Cl.$^4$ .................... A23L 1/00; H05B 1/00
[52] U.S. Cl. ..................................... 99/476; 99/474; 99/483; 99/516
[58] Field of Search .............. 99/467, 468, 473–476, 99/483, 516, 536, 342; 34/30, 48, 54, 196–198; 426/509–511; 312/236; 219/400, 401; 126/20, 21 A

[56] References Cited

U.S. PATENT DOCUMENTS

| 3,942,426 | 3/1976 | Binks et al. | 99/473 |
| 3,943,842 | 3/1976 | Bills et al. | 99/473 |
| 3,952,609 | 4/1976 | Klemm | 99/474 |
| 4,110,916 | 9/1978 | Bemrose | 99/476 X |
| 4,173,215 | 11/1979 | Bureau et al. | 99/476 X |
| 4,244,979 | 1/1981 | Roderick | 99/474 |
| 4,483,243 | 11/1984 | Cote | 99/468 |
| 4,531,306 | 7/1985 | Erickson | 99/483 X |
| 4,579,051 | 4/1986 | Berrens | 99/475 X |
| 4,646,630 | 3/1987 | McCoy et al. | 99/474 X |

FOREIGN PATENT DOCUMENTS 1484923 6/1966 France .................... 99/476

Primary Examiner—Timothy F. Simone
Attorney, Agent, or Firm—William J. Daniel

[57] ABSTRACT

A humidifier is provided for a closed defrosting cabinet for containing frozen food to be defrosted in a compartment thereof. A fan for circulating air is disposed in the defrosting cabinet. The defrosting chamber is humidified with humidified air circulated by the fan. The defrosting chamber is partitioned into a plurality of areas by a slidable partition wall consisting of at least two sections. The defrosting cabinet can maintain the temperature and the humidity constant, defrost the food rapidly, and prevent the surface of the food from drying and changing in color.

10 Claims, 14 Drawing Figures

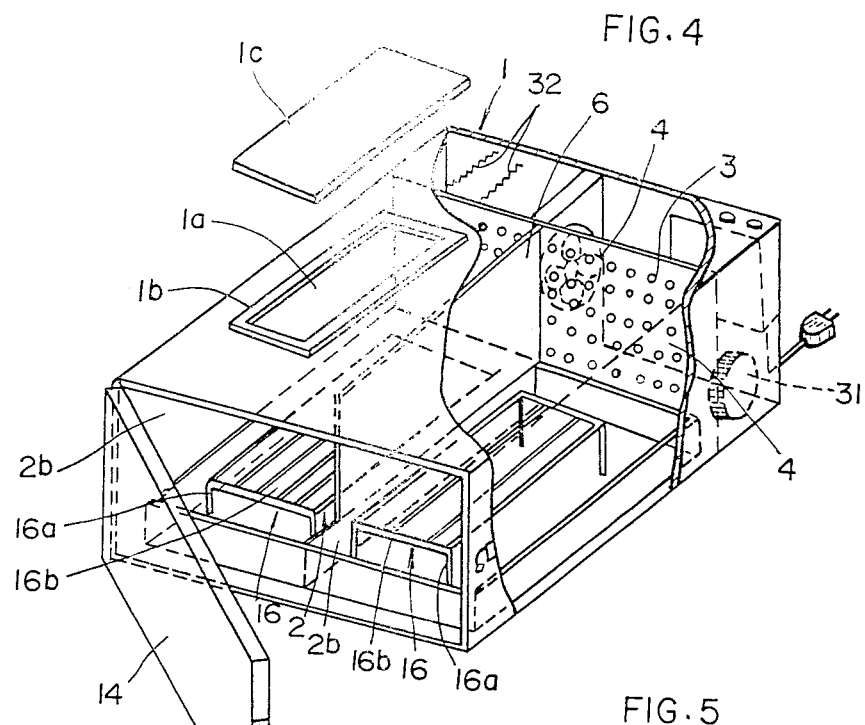
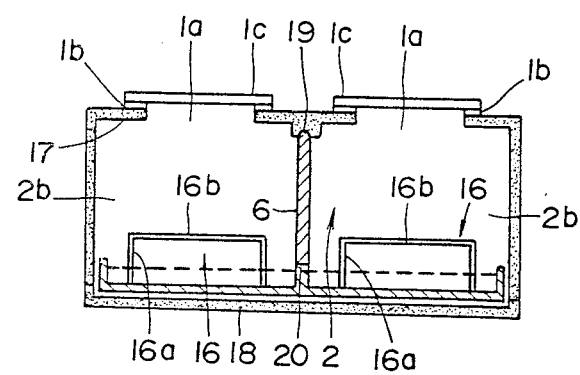
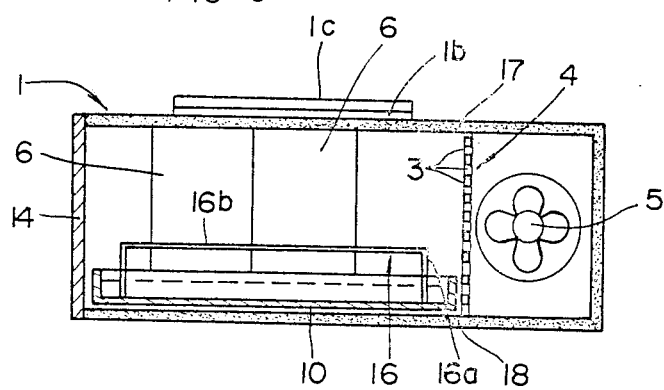

DEFROSTING CABINET

BACKGROUND OF THE INVENTION

1. Field of the Invention

The present invention relates to a cabinet which is installed on a counter top or refrigerator and used to defrost a relatively small amount of frozen food in an average home and, more particularly, to a defrosting device whose inside arrangement can be varied according to the size of frozen food to be defrosted or other condition.

2. Description of the Prior Art

When a relatively small amount of frozen food is defrosted in an average home, it is common practice to take it out of a frozen food compartment and allow it to stand on a counter top or contact it with running tap water. However, this common practice has the following disadvantages.

(1) When the food is defrosted while still wrapped with a packaging film of coating, a long time is required for defrosting. When the food is defrosted after it is unwrapped, dust and various germs in the air may attach themselves to the food.

(2) In case (1) above, the food is unintentionally often exposed after the optimum defrosting period has elapsed. This can adversely affect the taste of the food. Further, the surface of the food may dry out or change in color, with further deterioration in the quality.

(3) As defrosting progresses, water tends to drip from the food, and moisture in the ambient air can condense on the cooler food surface which increases the quantity of free water. This free water naturally stays in contact with the underside of the food, and therefore the exposed sides and the under side are defrosted at different ratios. In order to avoid this undesirable situation, it is necessary that the free water be frequently removed and that the food be inverted for avoiding uneven defrosting. In this way, optimum defrosting is quite cumbersome at best.

(4) When frozen food is defrosted rapidly, it is unavoidable that the surface regions and the interior regions defrost to different degrees. Hence, consideration should be given to choosing a cooking time to compensate for this difference. Also, in general, rapid defrosting results in a loss in taste.

In order to solve these problems, various defrosting devices have been proposed. However, none of them are satisfactory. The most serious, unsolved problem is that the space arrangement inside known defrosting devices cannot be varied. Specifically, when a large mass of frozen food is defrosted, the mass must be previously separated into into a smaller portion in a cumbersome manner. When a number of small portions of frozen food are defrosted, they must be piled on top of each other. This makes the defrosting difficult.

SUMMARY OF THE INVENTION

It is the main object of the present invention to provide a defrosting cabinet which is free of the foregoing drawbacks with the prior art methods.

It is another object of the invention to provide a defrosting cabinet having a defrosting space whose arrangement can be varied according to the size of frozen food.

The defrosting device according to the invention comprises a closed defrosting cabinet in which a fan for circulating air is disposed. A humidifier is also provided which uses of the air flow created by the fan to humidify the interior of the defrosting cabinet.

In one feature of the invention, the defrosting cabinet is partitioned into a plurality of areas by a slidable partition wall consisting of at least two parts.

BRIEF DESCRIPTION OF THE DRAWINGS

FIG. 4 is a perspective view of another defrosting cabinet according to the invention;

FIG. 5 is a front elevation in cross section of the device shown in FIG. 4;

FIG. 6 is a side elevation in cross section of the device shown in FIG. 4;

DETAILED DESCRIPTION OF THE PREFERRED EMBODIMENTS

Figure 1:
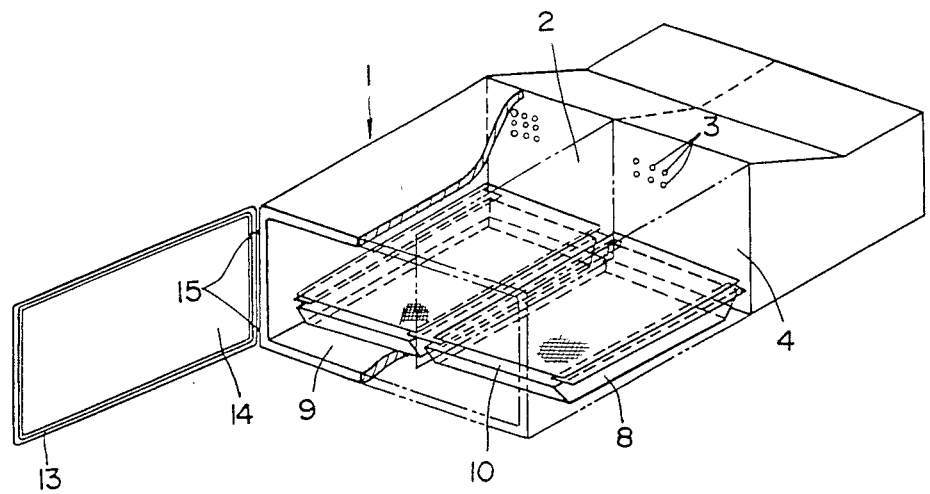
FIG. 1 is a perspective view of a defrosting cabinet according to the invention.
Figure 2:
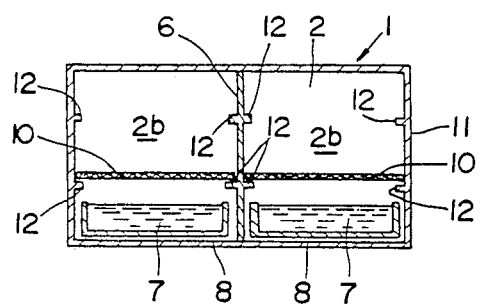
FIG. 2 is a front elevation in cross section of the device shown in FIG. 1.
Figure 3:
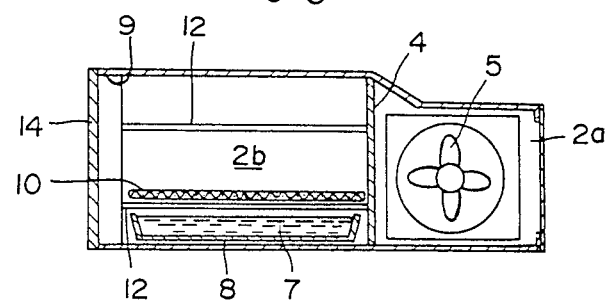
FIG. 3 is a side elevation in cross section of the device shown in FIG. 1.

Referring to FIGS. 1-3, there is shown a defrosting cabinet 1 according to the present invention. This cabinet has a closed defrosting chamber 2 which is partitioned into a fan-receiving compartment 2a and a defrosting compartment 2b by a partition wall 4 having a number of ventilating holes 3. A fan 5 for circulating air is disposed in the compartment 2a. The defrosting compartment 2b is further divided into two small chambers by a partition wall 6 mounted at the center of the compartment 2b, and has an opening 9 on its front side. Humidifiers or pans 8 store water 7 that is used to humidify the inside of the defrosting compartment 2b through the use of the air flow created by the fan 5. The pans 8 are placed on the floors of the small chambers and can be taken out of them through the opening 9.

Open mesh trays or platforms 10 on which frozen food (not shown) is placed for defrosting are disposed above the pans 8 in the defrosting compartment 2b. Each tray 10 is supported on a bracket 12 protruding from the central partition wall 6 and also on a cooperating bracket 12 protruding from the opposed side wall 11 of the defrosting chamber 2. The trays 10 can be taken into and out of the compartment 2b through the front opening 9 in the same manner as the pans 8. A door 14 having a magnetic packing 13 around its periphery is attached to the front opening 9 with a hinge 15 so that the door can open and close the opening.

Referring next to FIGS. 4-6, there is shown another defrosting chamber 1 according to the invention. This device is similar in structure and function to the device already described in connection with FIGS. 1-3, except for the following. The defrosting chamber 2 is partitioned into defrosting compartments 2b by the partition wall 6. The ceiling wall of each defrosting compartment 2b is partially provided with an opening 1a. A rubber packing 1b containing magnetic powder is mounted around the opening 1a to attract a cover 1c. When the defrosting cabinet 1 is put into a refrigerator, each cover 1c is removed to rapidly lower the temperature inside the device to the temperature inside the refrigerator. This device uses stands 16 each having legs 16a immersed in the water in each pan 8 and a horizontal lattice or bars 16b, instead of the open mesh trays 10 shown in FIGS. 1-3. The stands 16 eliminate the need for the brackets 12 shown in FIGS. 1-3.

In these two examples, the material from which the defrosting chamber 2 is made is not limited to certain materials. However, in order to hasten the defrosting process, adiabatic materials are preferably used. To facilitate checking the condition of defrosting, the chamber walls are made of a transparent material.

Figure 7:
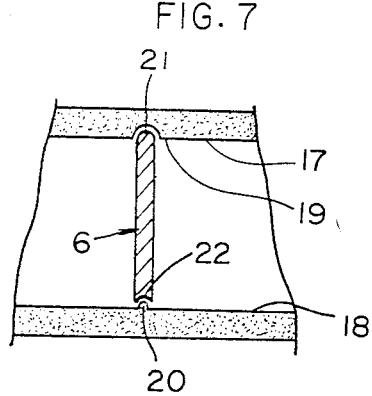
FIGS. 7 and 8 are cross-sectional views of partition walls that partition defrosting cabinets in different ways.
Figure 8:
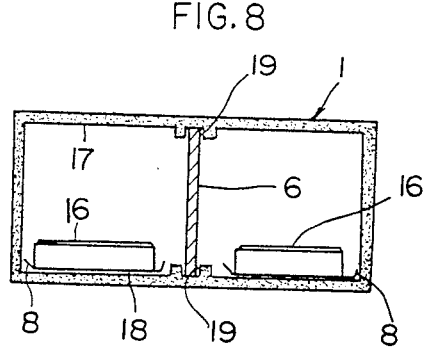

As shown in FIGS. 5-8, the aforementioned defrosting compartment 2b has a top wall 17 and a bottom wall 18 which are provided with a groove 19 and a projection 20, respectively. The groove 19 and the projection 20 extend longitudinally of the defrosting device in opposed relation to each other. The partition wall 6 consists of at least two sections, and is mounted so as to be slidable. The wall 6 has a rounded edge 21 at its upper end and a recessed edge 22 at its lower end. The rounded end 21 engages the groove 19, while the projection 20 engages the recessed edge 22. It is to be noted that the means for guiding and holding the partition wall 6 so as to be slidable are not limited to the groove 19 and projection 20. For example, as shown in FIG. 8, the opposed surfaces of the top wall 17 and the bottom wall 18 of the defrosting compartment 2b may be provided with grooves 19. Further, the opposed surfaces may be provided with projections.

In any case, the means for partitioning the interior of the defrosting compartment is not limited to the above examples. Rather, any means may be adopted as long as it can humidify the circulating air by the use of the air flow, which is created by the fan 5 and blows over the pans 8 holding water 7 to evaporate the water 7. Further, the humidifier is not limited to pans as a source of water. For instance, a water-containing material, such as sponge absorbing water or wet towel, may also be used. In addition, frozen food and the pans storing water may be put into the defrosting compartment 2b in ways other than through the front opening. As an example, they may be loaded through a lateral side opening, not illustrated.

When frozen food is placed on the trays 10 in the defrosting compartment 2b of the defrosting cabinet as constructed above and a defrosting control section (not shown) is operated, the fan 5 rotates and a motor (not shown) for driving the fan 5 is operated to thereby generate heat. This keeps the temperature inside the defrosting compartment 2b higher than the ambient temperature by a few degrees of centrigrade. The air flow created by the fan 5 passes through the ventilating holes 3 in the partition wall 4 and circulates to evaporate the water 7 in the pans 8, producing wet circulating air flow. The latent heat of the water evaporating from the water 7 in the pans 8 maintains the temperature and humidity of the atmosphere inside the defrosting compartment 2b substantially constant for a long time. Therefore, the frozen food can be thawed in a short time without drying the surface or changing its color.

Figure 9:
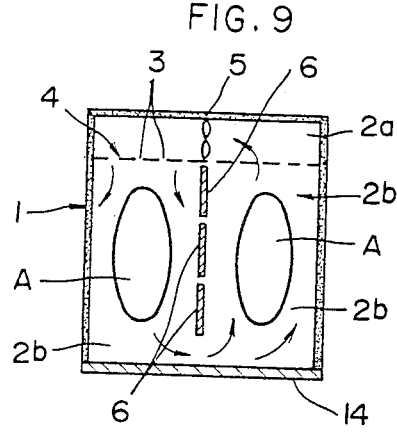
FIGS. 9 and 10 are schematic plan views in cross section of a defrosting cabinet, showing differing interior air flow paths.
Figure 10:
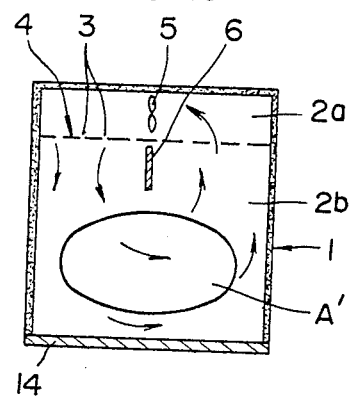

When, as shown in FIG. 9, smaller masses of frozen food (indicated at A) are defrosted using the device shown in FIGS. 6-8, they can be held in the separate chambers formed by partitioning the defrosting compartment 2b by the partition wall 6. If a relatively large mass A' of frozen food is to be defrosted, as in FIG. 10, a section of the partition wall 6 is removed according to the size of the food A' to enlarge the space available for defrosting.

Where the defrosting cabinet is installed in a refrigerator, any unpleasant odor can be removed from inside the defrosting cabinet and the refrigerator by installing a deodorizing unit (not shown) in the air flow path. Therefore, it is unlikely that the odor is transferred to the defrosted food.

Figure 11:
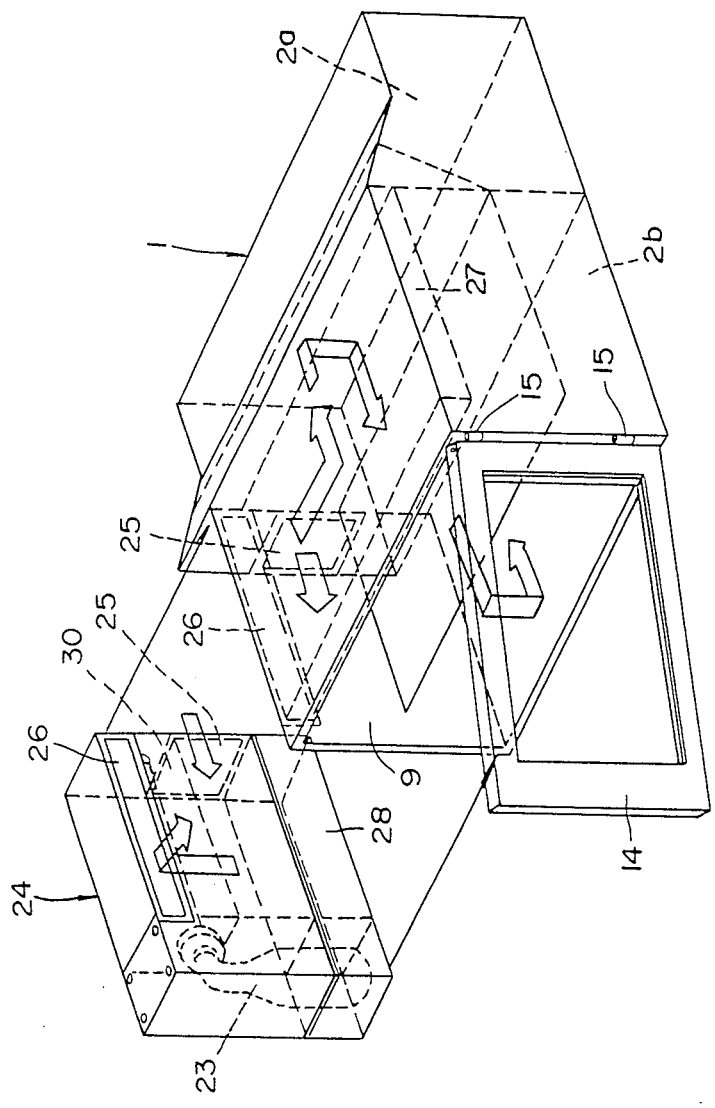
FIG. 11 is a partially exploded perspective view of another defrosting cabinet according to the invention.
Figure 12:
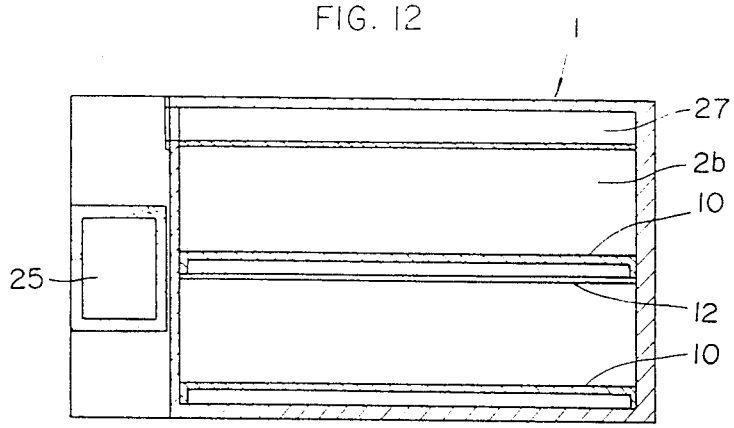
FIG. 12 is a front elevation in cross section of the device shown in FIG. 11.
Figure 13:
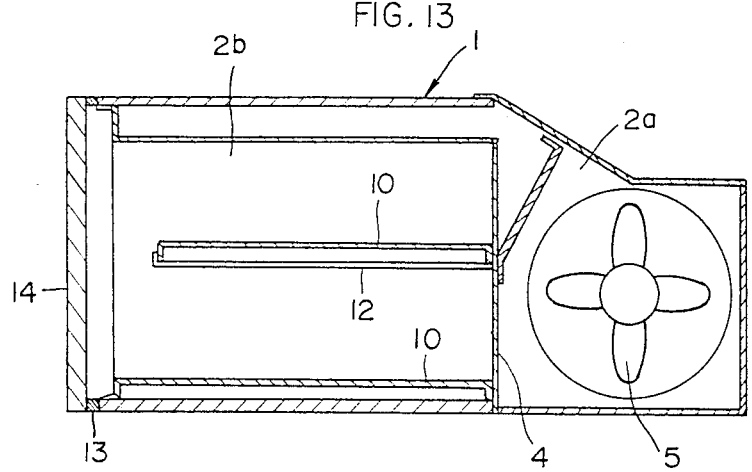
FIG. 13 is a side elevation in cross section of the device shown in FIG. 11.
Figure 14:
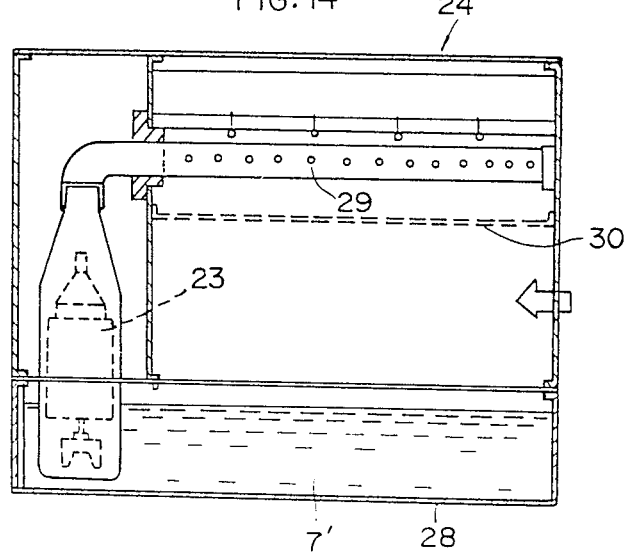
FIG. 14 is a cross-sectional view of the humidifier of the device shown in FIG. 11.

Referring next to FIGS. 11-13, there is shown a further defrosting cabinet according to the invention. This device humidifies the interior of its defrosting compartment 2b by forcing air through the compartment 2b. More specifically, a forced-spray humidifier 24 having a pump 23 is mounted at one side of the above-described defrosting chamber 2. The compartment 2a in which the circulating fan is mounted has an opening 25 for sending out air. The humidifier 24 also has an opening 25 that is in communication with the opening 25 of the compartment 2a. The upper portion of the humidifier 24 has an opening 26 for delivering humidified air from the duct at the top. The defrosting compartment 2b also has an opening 26 which is in communication with the opening 26 of the upper portion. A duct 27 communicating with the opening 26 is formed at the top of the defrosting compartment 2b. The air flow created by the fan 5 is forced into the defrosting compartment 2b after passing through the humidifier 24. As shown in FIG. 14, this humidifier 24 mainly consists of a reservoir 28 for storing water 7' that is used for humidifying purposes, the aforementioned pump 23 whose suction end is located in the reservoir 28, a water-spraying pipe 29 connected to the discharging end of the pump 23, and a flat perforated plate 30 for allowing the air (indicated by the arrow) from the defrosting compartment 2b to come into contact with water spray.

The means for bringing the air from the defrosting compartment into contact with the water spray is not limited to a perforated plate. For example, a wetted wall (not shown) may be used instead. This example shown in FIGS. 11-13 is similar in other respects to the first-mentioned example shown in FIGS. 1-3. Like components are indicated by like reference numerals throughout these figures and will not be described again.

In the three examples thus far described, electrical equipment and switches necessary to operate the defrosting cabinets are ordinary components mounted in ordinary places to function ordinarily. The velocity of the air flow created by the fan 5 can be varied. Also, it is possible to change the time taken to defrost frozen food as well as the condition in which the food is defrosted.

Further, it is possible to install a buzzer or other warning device operated by a timer in the novel defrosting cabinet. In this case, when frozen food has been completely defrosted or a desirably defrosted condition is achieved, a warning sound is produced to accurately inform the user of the instant at which that condition is reached. This is convenient for cooking.

Further, it is possible to mount a heat generator equipped with a temperature control unit in the defrosting compartment 2. It will accelerate the defrosting process when the atmospheric temperature is low in winter or rapid defrosting is needed.

Where the novel defrosting device is installed in a domestic refrigerator, it is possible to defrost frozen food by the use of an external power supply or a power supply within the refrigerator. In this case, the defrosting is not affected by variations in the ambient temperature. Thus, stable defrosting is assured throughout the year. However, the space required for defrosting is not permanently established in the refrigerator. This can avoid a loss in the efficiency of utilization of space in the refrigerator.

As described thus far, the novel defrosting device has a defrosting compartment in which a fan for circulating air is installed. A pan restoring water for humidifying the inside of the defrosting compartment by the use of the air flow created by the fan is provided. Or, a forced spray humidifier having a pump is mounted. The rotation of the fan and the motor for driving the fan generate heat to keep the temperature inside the defrosting compartment slightly higher than the ambient temperature. The humidifying effect of the humidifier can maintain the temperature and humidity inside the defrosting compartment constant. Thus, the novel device can defrost frozen food faster than the conventional device. Additionally, it can prevent the surface of defrosted food from drying and changing in color. Further, since the space arrangement for defrosting can be varied according to the size of frozen food, the efficiency of defrosting can be enhanced.

Furthermore, frozen food can be thawed out without the need for unwrapping. In this case, dust and germs in air will not attach themselves to the food. When a warning device 31 is installed (see FIG. 4), a defrosting can be completed in an optimum time. This can provide food in a defrosted condition that gives the best taste.

As a defrosting process proceeds, all free water runs through the open-mesh tray or horizontal bars or lattice on a stand and falls into the humidifying pan. Consequently, the back side of the defrosted food is prevented from being ever wet. Rather, the food is defrosted to the same extent on all sides. This prevents uneven defrosting.

When frozen food is defrosted rapidly, the temperature and humidity inside the defrosting compartment are always kept optimum. Therefore, it is unlikely that the portion of the food close to the surface and the interior portion are defrosted to different extents. Hence, the food is defrosted such that the best taste is afforded. When a heat generator 32 equipped with a temperature control unit is installed (see FIG. 4), frozen food can be defrosted rapidly at the temperature best suited for defrosting.

The following table compares the defrosting results obtained by the first example (shown in FIGS. 1–3) and the third example (shown in FIGS. 11—14) with the case in which frozen food is allowed to stand exposed in a room. The food was a piece of bigeye tuna having a thickness of 24 mm and a weight of 350 g.

TABLE

| Device | 1-st example with pans | 3-rd example with pump | allowed to stand |
|---|---|---|---|
| Defrosting temperature | 7 to 10° C. | 7 to 8.5° C. | 15° C. |
| Relative humidity | about 80% | about 95% | 45% |
| Wind velocity | about 1.5 m/s | about 1.0 m/s | — |
| Time taken for interior part to reach −3° C. | 50 min. | 60 min. | 350 min. |
| Color and gloss after defrosting | Surface hardly dried. Colored considerably. | Surface did not dry. No color change. | Upper surface somewhat dried. Color changed. |
| Dripping after defrosting | Hardly observed. | Hardly observed. | about 3% |
| Remarks | Defrosted rapidly. The defrosted food was in good condition. | Defrosted rapidly. The defrosted food was in good condition. | Defrosted slowly. Posed problems of dryness, color change, dripping |

What is claimed is:

1. A defrosting cabinet comprising a defrosting chamber for containing frozen food to be defrosted, a humidifying compartment separate from said defrosting chamber and in communication therewith at spaced apart ports opening into said defrosting chamber, means for circulating a flow of air from said defrosting chamber through said humidifying compartment via said spaced-apart ports and back to said defrosting chamber, and pump-operating spray means disposed in said humidifying compartment between said ports for projecting plural streams of water into the path of said flow of air passing through said humidifying compartment.

2. A defrosting cabinet according to claim 1, wherein said defrosting chamber is adapted to be divided into two compartments by a partition wall.

3. A defrosting cabinet according to claim 2, wherein the partition wall consists of a least two sections arranged end to end, each of which is slidable individually.

4. A defrosting cabinet according to claim 1, including a fan compartment separated from said defrosting chamber by a partition wall, and said partition wall is provided with ventilating holes for communicating respectively with said humidifying compartment and said defrosting chamber to said circulating air flow.

5. A defrosting cabinet according to claim 1, further comprising signalling means for indicating when the food has been fully defrosted.

6. A defrosting cabinet according to claim 1, further comprising heating means equipped with a temperature control unit in the defrosting chamber.

7. A defrosting device according to claim 3, wherein said defrosting chamber has a top wall and a bottom wall carrying opposed track means for slidably supporting said partition wall sections.

8. A defrosting cabinet as in claim 1, wherein said humidifying compartment comprises a humidifying water sump at the bottom thereof, a pump connected at its inlet to said sump, a water spray nozzle connected to the outlet of said pump above said sump, said spray nozzle being disposed in the path of said circulating air flow.

9. A defrosting cabinet as in claim 8, including duct means for guiding said air flow upwardly past said spray nozzle.

10. A defrosting cabinet as in claim 8 wherein said nozzle is an elongated pipe extending across said humidifying compartment, said pipe having apertures along its length for projecting said plural streams of water generally transversely to the direction of said flow of air through said humidifying compartment.

* * * * *